United States Patent [19]

Fitz

[11] 4,424,787
[45] Jan. 10, 1984

[54] ENCAPSULATED PTC HEATER FOR COLD-START CARBURETOR

[75] Inventor: Edward J. Fitz, Fairfield, Conn.

[73] Assignee: Sun Chemical Corporation, New York, N.Y.

[21] Appl. No.: 408,374

[22] Filed: Aug. 16, 1982

[51] Int. Cl.$^3$ .......................................... F02M 31/00
[52] U.S. Cl. .................................. 123/549; 219/206; 261/142
[58] Field of Search ................ 123/549, 552; 219/301, 219/307, 206, 306, 528, 548, 547, 385; 338/212, 214; 431/208, 209; 261/142

[56] References Cited

U.S. PATENT DOCUMENTS

| | | | |
|---|---|---|---|
| 1,472,233 | 10/1923 | Taylor | 123/549 |
| 4,177,778 | 12/1979 | Naitou | 123/549 |
| 4,279,234 | 7/1981 | Marcoux | 123/549 |
| 4,308,845 | 1/1982 | Sarto | 123/549 |
| 4,345,569 | 8/1982 | Hattori | 123/549 |
| 4,359,974 | 11/1982 | Igashira | 123/549 |
| 4,362,142 | 12/1982 | Igashira | 123/549 |
| 4,387,676 | 6/1983 | Couceiro | 123/549 |
| 4,387,690 | 6/1983 | Chiavaroli | 123/549 |

Primary Examiner—Ronald H. Lazarus
Attorney, Agent, or Firm—Cynthia Berlow

[57] ABSTRACT

An encapsulated PTC heater for a cold-start carburetor comprises a ceramic PTC wafer having ohmic terminal means on its opposite faces, and a thickened annular rim portion adapted to withstand appreciable clamping forces. The rim has portions of said ohmic terminal means. An annular metal holder assemblage has opposite ring portions overlying said thickened rim portion, and has ring-like contacts engaged with the rim portion to bring current thereto. One of the ring-like contacts is nested in an insulating annulus to isolate it from the remainder of the metal holder assemblage, and has a terminal lug extending through an insulating bushing to the exterior. The other ring-like contact is resilient in nature, and is clamped against the rim portion of the wafer by lugs of an annular metal housing constituting part of the holder assemblage. The resilience of the ring-like contact, in conjunction with the thickened rim portion of the wafer enable crimping or folding of the clamping lugs to be effected for assembly purposes without cracking of the wafer, and insure reliable contact being made to the wafer at all times.

12 Claims, 16 Drawing Figures

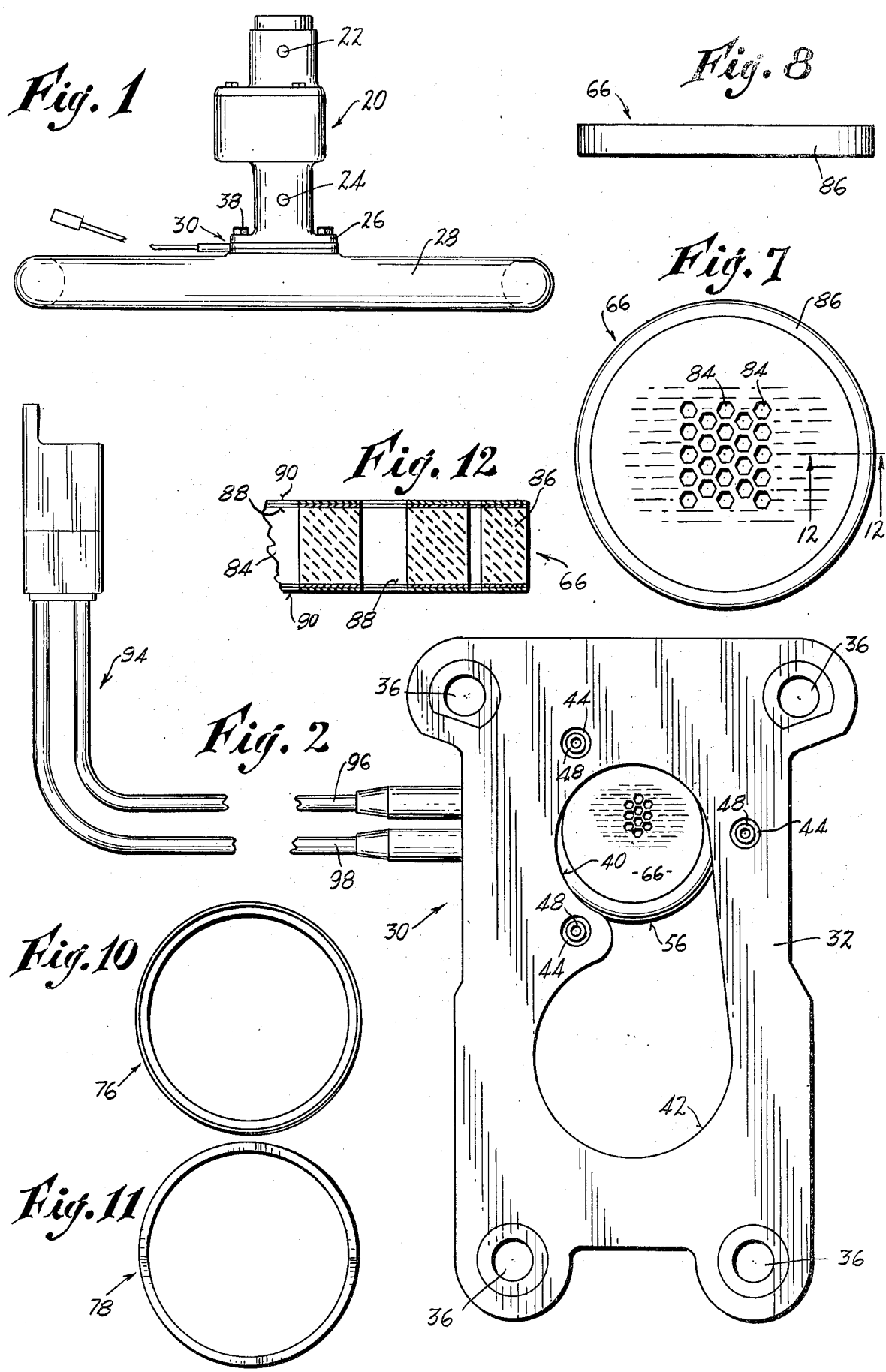

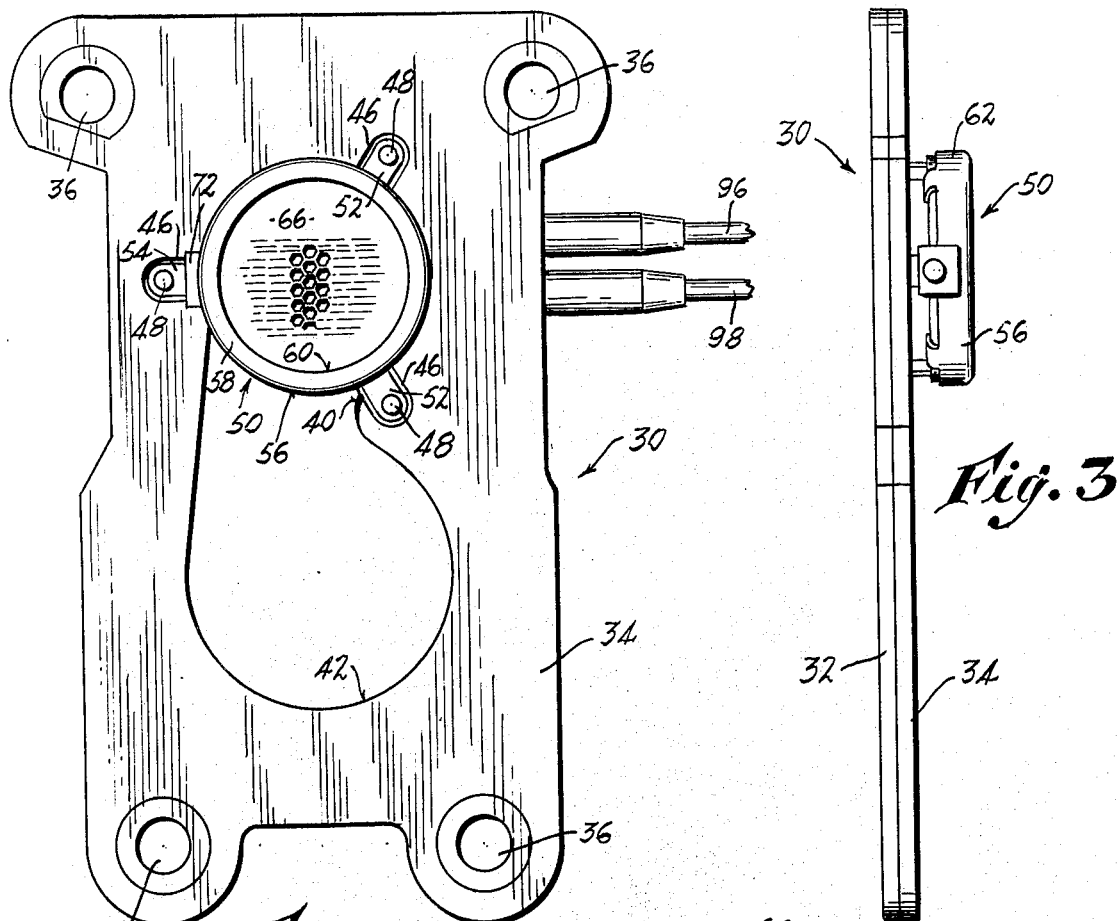
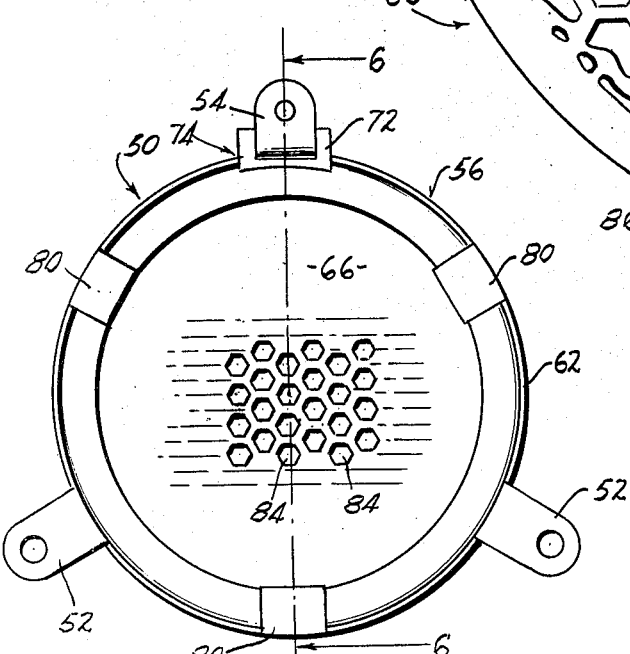
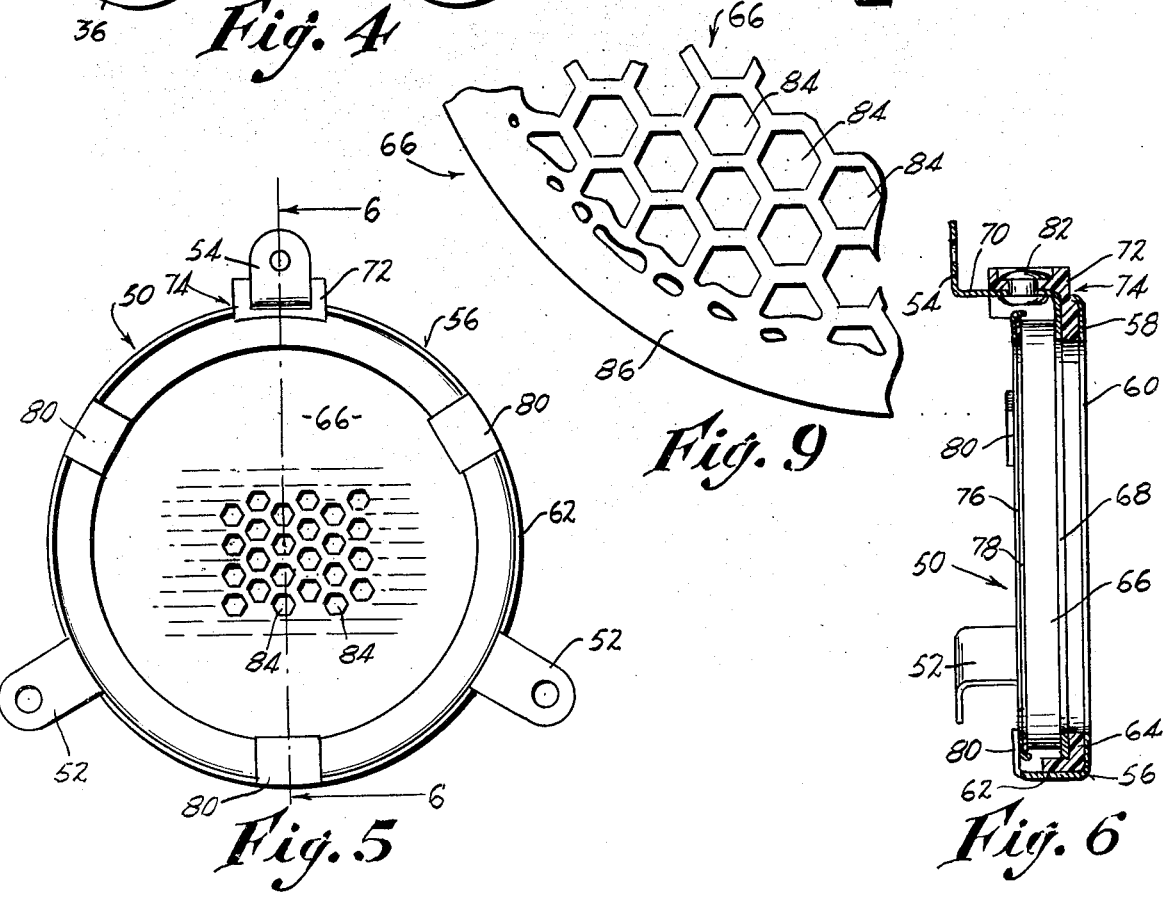

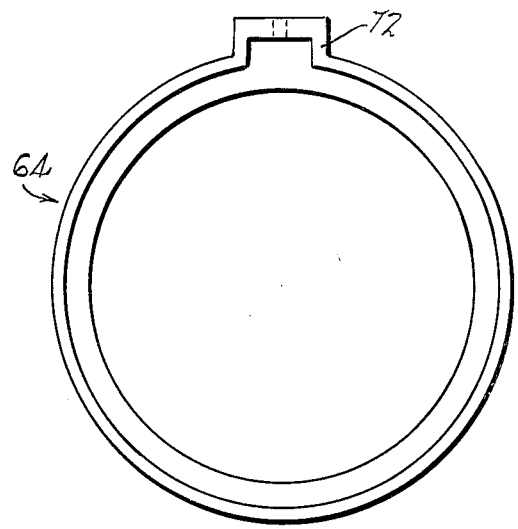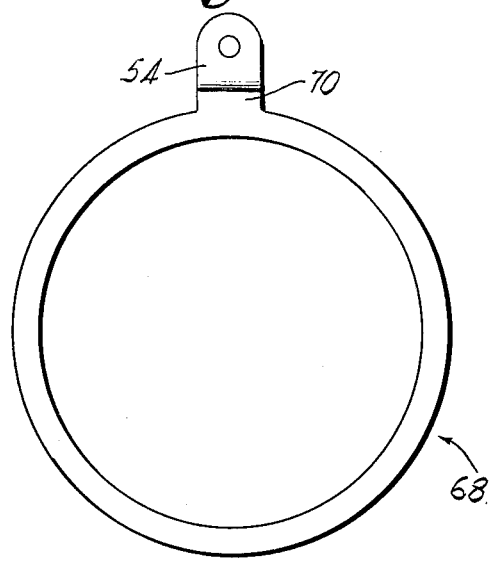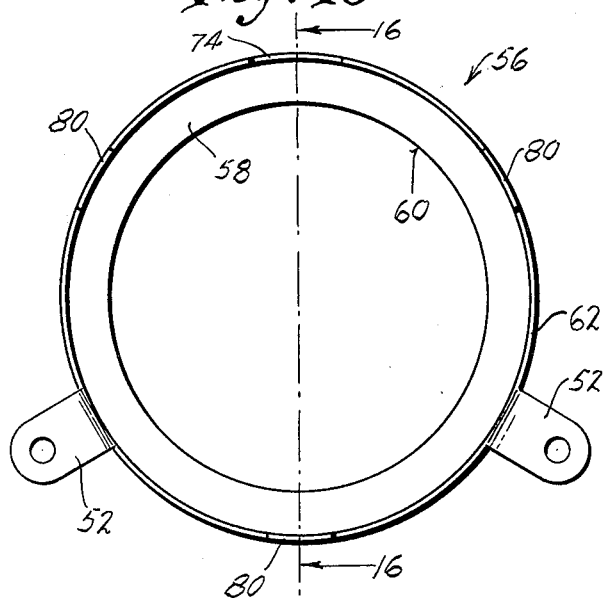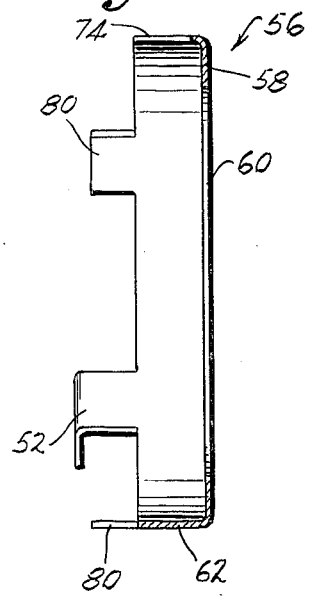

ENCAPSULATED PTC HEATER FOR COLD-START CARBURETOR

NO CROSS REFERENCES TO RELATED APPLICATIONS OR PATENTS

Prior Art U.S. Pat. Nos. Considered To Be Most Pertinent: 3,625,190 Boissevain 12/7/71; 3,927,300 Wada et al. 12/16/75; 3,987,772 McBride Jr. 10/26/76; 4,232,214 Shioi et al. 11/4/80.

BACKGROUND

This invention relates to cold-start carburetors, and more particularly to early fuel vaporization heater devices intended to be installed at the carburetor to facilitate the cold starting of an internal combustion engine. Especially the invention relates to PTC type heaters adapted for the above purpose.

In the past various types of fuel pre-heater devices arranged for incorporation at the carburetor or in the fuel system of an automobile have been proposed and produced. These acted on the principle that raising the temperature of the fuel introduced into the cylinders, especially at lower ambient temperatures, facilitated the firing and starting of the engine. Wire wound and other types of resistive heaters were placed in the fuel vapor passages, and found to function well, within the limitations involved.

More recently, with the development of PTC ceramic materials, these were used in various modes in conjunction with carburetors to effect control of the choke valve, control of air by-pass valves and also to impart heat to the fuel and/or fuel air mixture. The advantage of the ceramic PTC heaters was one of self regulation or control of the heating, since the resistance increased and the current decreased greatly as the temperature of the ceramic substance rose, without requiring great dependence on other heat or current regulators. However, the mass of the ceramic being greater than that of wire-type heaters, there was an increased resistance to the flow of the fuel mixture through the carburetor. Also, the ceramic was susceptible of cracking or breakage more easily, and required more care in its handling and fabrication. Moreover, careless installation could result in a cracked ceramic unit and an inoperative device, which then had to be replaced.

SUMMARY

The above disadvantages and drawbacks of prior early fuel evaporation heaters are obviated by the present invention, and one object of the invention is to provide an improved PTC heater device for use with carburetors, which is especially durable and rugged, and not likely to become easily damaged or rendered inoperative either during assembly, or installation and use.

Another object of the invention is to provide an improved PTC heater device as above set forth, in the form of a capsule or unit which can be conveniently handled and worked as for assembly operations, without danger of breakage and without involving reject procedures as regards the ceramic unit.

A further object of the invention is to provide an improved encapsulated PTC heater for carburetors and the like, which has simple and straight-forward terminal means that facilitate the incorporation and use of the heater with other structures, such as mounting plates, etc.

Yet another object of the invention is to provide a novel and improved encapsulated PTC heater as above characterized, which is especially simple in its construction and yet reliable and efficient in operation.

Still another object of the invention is to provide an improved encapsulated PTC heater in accordance with the foregoing, which is economical to fabricate and produce.

A feature of the invention is the provision of an improved, encapsulated PTC heater as above set forth, which presents the least possible resistance to the fuel/air flow in the carburetor.

Still another feature of the invention is the provision of an improved encapsulated PTC heater for carburetors as outlined above, together with simple means for incorporating and mounting the same at the carburetor in a fool-proof and effective manner.

Still other features and advantages will hereinafter appear.

In accomplishing the above objects the invention provides an encapsulated carburetor-mixture heater comprising an electrical resistance ceramic wafer of PTC material and a holder assemblage for the same, to mount the heater in the air/fuel passage of the carburetor. The wafer has on its opposite side-surfaces, ohmic terminal means for conducting current through the resistance thereof, and has a thickened annular peripheral portion surrounding a multiplicity of passages entending through it from one side to the other. The passages preferably have hexagonal outlines and together form a regularly interfitted passageway means through the wafer, which offers the least possible resistance to the air/fuel flow through the carburetor. Also, the resistive grid represented by the hexagonal structure presents a relatively large exposed surface area which maximizes the transfer of heat from the ceramic material to the air/fuel flow.

The holder assemblage comprises an annular metal shell which has a continuous, inwardly-extending flange constituting its bottom wall, and an annular side wall provided with clincher lugs. In the shell is an annular wafer holder of insulating material, in which the wafer is nested by virtue of the holder walls being of angular cross section. A circular metal contact ring in the holder engages the ohmic terminal means at one side surface of the peripheral portion of the wafer, said metal ring having a laterally-extending connector portion passing through the side wall of the metal shell. An insulating bushing isolates the connector portion of the ring from the shell, which carries also a ring-shaped resilient contact means that engages the ohmic terminal means at the opposite side surface of the peripheral portion of the wafer. The clincher lugs are folded over the resilient contact means and hold the same and the wafer captive in the metal shell. The lugs insure a good electrical contact between the resilient contact means and the shell, and such contact means and the circular metal contact ring oppositely clamp the thickened annular peripheral portion of the wafer, which latter resists cracking due to its increased mass and strength.

In the accompanying drawings, illustrating a preferred embodiment of the invention:

FIG. 1 is a side elevational view of a carburetor and intake manifold of an engine, having incorporated in it the improved encapsulated PTC heater of the invention.

FIG. 2 is a plan view of the accessory for the carburetor and manifold, having the encapsulated PTC heater of the invention in mounted position thereon.

FIG. 3 is an edge elevational view of the accessory shown in FIG. 2, viewed from the right side thereof.

FIG. 4 is an opposite plan view of the accessory.

FIG. 5 is a plan view of the encapsulated heater provided by the invention.

FIG. 6 is a diametric section, taken on the line 6—6 of FIG. 5.

FIG. 7 is a side or plan view of the ceramic heater unit embodied in the encapsulated heater.

FIG. 8 is an edge view of the ceramic heater unit.

FIG. 9 is a fragmentary view, enlarged, of a peripheral portion of the ceramic heater unit.

FIG. 10 is a plan view of a clamping ring, constituting part of a resilient connector or contact assemblage held in place by crimping lugs.

FIG. 11 is a plan view of a metal wave washer, constituting a cooperable part of the contact assemblage held in place by the crimping lugs.

FIG. 12 is a fragmentary sectional view, enlarged, of an edge portion of the ceramic wafer or heater unit, taken on the line 12—12 of FIG. 7.

FIG. 13 is a plan view of an insulating annular wafer holder, in which the ceramic wafer is nested.

FIG. 14 is a plan view of a contact ring which is carried in the wafer holder.

FIG. 15 is a plan view of the metal shell or casing of the encapsulated heater, and FIG. 16 is a diametric section of the shell, taken on the line 16—16 of FIG. 15.

Referring first to FIG. 1 there is shown a fuel vaporization system of an internal combustion engine, comprising a carburetor 20 having a choke shaft 22 and throttle shaft 24, and having a mounting flange 26 by which it is secured to the intake manifold 28.

Interposed between the carburetor mounting flange 26 and the intake manifold 28 is an early fuel evaporation accessory designated generally by the numeral 30, such accessory incorporating the improved encapsulated PTC heater provided by the invention. Such accessory is illustrated in its entirety in FIGS. 2, 3 and 4 with the exception of parts of the wire leads therefrom. As shown in these figures, the accessory comprises a pair of flat mounting plates 32 and 34 which have similar outlines that conform to the cooperable surfaces of the carburetor and manifold. The plates 32 and 34 have matched bolt holes 36 which receive the bolts 38 of the engine, as shown in FIG. 1.

The mounting plates 32 and 34 have large openings 40 and 42 which conform to the fuel/air passages in the carburetor, as can be understood, and the plates are like thick, rigid gaskets as interposed at the location indicated in FIG. 1.

As seen in FIGS. 2 and 4, the plates 32 and 34 have aligned mounting holes for the encapsulated heater, the holes in the plate 32 being countersunk and designated 44, whereas the holes in the plate 34 are located in recesses 46 that are adapted to receive mounting lugs described below. Rivets 48 passing through the aligned holes described above, secure the plates 32 and 34 in assembled relation as shown.

In accordance with the present invention there is provided, for securement to the mounting plates 32 and 34, and improved encapsulated PTC heater assemblage which is designated generally by the numeral 50, see FIGS. 3, 5 and 6. This encapsulated heater has mounting and connector lugs 52 and 54 respectively, that are held under the rivets 48 and mount the assemblage on the mounting plates 32 and 34.

Considering FIGS. 5 and 6, this assemblage is seen to be constituted of a ring-shaped or circular metal shell 56 having in its bottom wall 58 a large central opening 60. The shell 56 has an annular side wall 62 of cylindrical configuration, and the bottom wall 58 is in the nature of an inturned flange by virtue of the large opening that it has. Seated in the shell 56 is an annular insulating member 64 that constitutes a holder for a ceramic wafer 66 illustrated in FIGS. 7 and 8, and interposed between the wafer 66 and the holder 64 is a circular metal contact ring 68 which has a laterally-extending connector portion 70 passing through the side wall 62 of the shell.

The connector portion 70 is insulated from the shell 56 by an insulating bushing 72 which is preferably integral with the holder 64. The bushing 72 is disposed in a cut-out portion of the shell, indicated at 74, FIGS. 5 and 6. The portion 70 constitutes the connector lug 54 previously mentioned, and is one of the mounts for the heater capsule, as readily seen.

The invention further provides a ring-shaped resilient contact means of metal, which engages the ohmic terminal means at the opposite side surface of the peripheral portion of the wafer 66; that is, the side opposite to that engaged by the contact ring 68. The resilient contact means is constituted of two metal rings, one being a clamping ring designated 76, see FIG. 10, and the other being in the form of a metal wave washer 78, FIG. 11. The clamping ring 76 is flanged, as seen in FIG. 6, and nests the wave washer 78. This assemblage of ring and washer is applied to the side surface of the wafer, and then crimping lugs 80 provided on the side wall 62 of the shell 56 are folded over, to hold the ring and washer captive in the shell, as well as the wafer 66, contact ring 68 and holder 64.

As seen in FIG. 6, a rivet 82 passes through the bushing 72 and the connector extension 70, thereby forming a convenient subassembly of the holder 64 and the ring 68, which facilitates the assembly of the encapsulated heater parts.

The shell 56 forms a casing or housing, as can be seen in FIG. 3, and provides a strong and sturdy protection for the wafer 66.

In its preferred form, the wafer 66 has a multiplicity of passages 84 of hexagonal outline, forming a regularly interfitted multiple passageway means through it, and has a thickened annular peripheral portion 86 which is made sufficiently strong to withstand considerable clamping forces without cracking or breaking. Thus, the crimping of the lugs 80 over the resilient metal contact means comprising the ring 76 and wave washer 78 will not damage the wafer, and instead will insure the establishment of effective and reliable electrical connection to the wafer.

Referring to FIG. 12, the wafer 66 can be provided with silver coatings 88 on its opposite sides, over which chrome coatings 90 can be plated. Other coatings are also used in fabricating PTC wafers; (called ohmic terminals). The coatings 88 and 90 establish good electrical contact with the contact ring 68 and the wave washer 78, which latter in turn contacts the clamping ring 76 that is engaged by the lugs 80. Thus, the electrical connections to the wafer 66 are made through the shell 56 and its lugs 52, on the one hand, and through the connector lug 54 on the other hand. FIG. 2 shows a pair of lead wires 94 extending to a separable connector fitting, one wire being designated 96, and the other 98. Lead 96 is electrically connected to one of the lugs 52, with lead 98 being connected to the lug 54. Conductors from these leads extend between the plates 32 and 34, to the respective lugs, as can be readily understood.

The hexagonal pattern of the holes in the wafer provide for the least resistance to the flow of air and fuel mixture through the carburetor while at the same time showing the largest surface areas to such flow, so as to impart the greatest amount of heat to the mixture from the ceramic material.

It will now be seen from the foregoing that the invention has provided an especially simple and effective yet strong and sturdy, damage-resistant encapsulated PTC heating unit for use with engine fuel systems, to effect early vaporization of the fuel mixture whereby improved cold-start characteristics are exhibited by the carburetor.

Variations and modifications are possible without departing from the scope of the claims.

What is claimed is:

1. An encapsulated PTC heater unit for a cold-start carburetor, comprising, in combination:
(a) an electrical resistance ceramic wafer of PTC material,
(b) a holder assemblage for mounting said wafer in an engine carburetor, in the air/fuel passage thereof,
(c) said wafer having on its opposite side surfaces ohmic terminal means for conducting current through the resistance thereof,
(d) said wafer having a thickened annular peripheral portion and a multiplicity of passages extending through it from one side to the other, said passages having hexagonal outlines and forming a regularly interfitted passageway means through the wafer,
(e) the portions of said wafer which define said hexagonal passages constituting a resistive honeycomb grid of relatively large exposed surface area which offers a reduced resistance to air/fuel flow through it while at the same time maximizing the transfer of heat from the ceramic material to said air/fuel flow,
(f) said holder assemblage comprising an annular metal shell having a continuous, inwardly extending flange constituting its bottom wall, having an annular side wall, and having clincher lugs carried by said side wall,
(g) an annular wafer holder of insulating material, in which the wafer is nested, located in said shell,
(h) the walls of said holder having an angular cross section,
(i) a circular metal contact ring in said holder, engaging the ohmic terminal means at one side surface of the peripheral portion of said wafer, said metal contact ring having a laterally-extending connector portion passing through the side wall of said metal shell,
(j) bushing means, insulating said connector portion of the contact ring from the metal shell,
(k) a ring-shaped resilient metal contact means in said metal shell, engaging the ohmic terminal means at the opposite side surface of the peripheral portion of said wafer,
(l) said clincher lugs being folded over said resilient contact means and holding the same and the wafer captive in said metal shell,
(m) said resilient contact means being in good electrical contact with said metal shell,
(n) said resilient contact means and said circular metal contact ring clamping the thickened annular peripheral portion of the wafer and said peripheral portion resisting cracking under the pressure of said clamping action.

2. The invention as set forth in claim 1, wherein:
(a) said resilient metal contact means comprises a wave washer, and
(b) an anhular metal ring engaging the wave washer, and secured and engaged by said clincher lugs whereby the wave washer is sandwiched between the said ring and the said ohmic terminal means at the opposite side surface of the peripheral portion of said wafer.

3. The invention as set forth in claim 1, wherein:
(a) said annular wafer holder and said bushing means are integral with one another.

4. The invention as set forth in claim 1, wherein:
(a) said clincher lugs are three in number, and are disposed circumferentially on the order of 120° apart from one another.

5. The invention as set forth in claim 1, wherein:
(a) said shell has an electrical connector lug to facilitate making external electrical connections to the wafer.

6. The invention as set forth in claim 5, wherein:
(a) said holder assemblage comprises a mounting plate of insulating material,
(b) said electrical connector lug being apertured to enable it to be secured to said insulated mounting plate by a suitable fastener.

7. The invention as set forth in claim 1, wherein:
(a) said holder assemblage comprises a mounting plate of insulating material,
(b) a mounting lug for securing said wafer and metal shell to the mounting plate,
(c) said mounting lug constituting the said laterally-extending connector portion of the metal contact ring.

8. The invention as set forth in claim 7, wherein:
(a) said bushing means is riveted to the said laterally-extending connector portion of the metal contact ring.

9. The invention as set forth in claim 1, wherein:
(a) said resilient metal contact means comprises a wave washer, and
(b) an annular metal ring engaging the wave washer,
(c) said wafer being sandwiched between the circular metal contact ring and the assembly consisting of the wave washer and annular metal ring.

10. The invention as set forth in claim 1, wherein:
(a) said holder assemblage comprises an insulating mounting plate,
(b) said wafer, annular metal shell and circular metal contact ring being secured to said insulating mounting plate by a plurality of lugs,
(c) one of said lugs being electrically connected with said metal shell and having means for enabling external electrical connection to be made thereto,
(d) the other of said lugs being electrically connected with said circular metal contact ring and having means for enabling external electrical connection to be made thereto.

11. The invention as set forth in claim 10, and further including:
(a) an additional lug electrically connected with said metal shell, said lug being integral with the said metal shell and the one lug.

12. The invention as set forth in claim 2, wherein:
(a) said annular metal ring has a peripheral flange which cradles the wave washer and maintains the two parts centralized with respect to one another.

* * * * *